Sept. 6, 1927.
O. S. HERSHEY
AUTOMOBILE LOCK
Filed Dec. 12, 1923
1,641,811
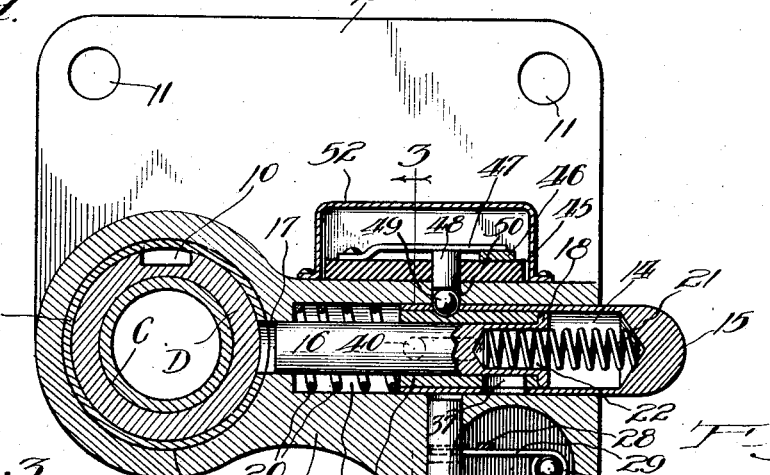
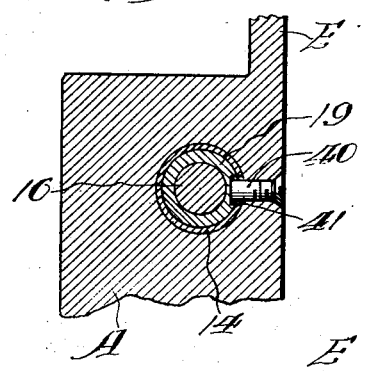
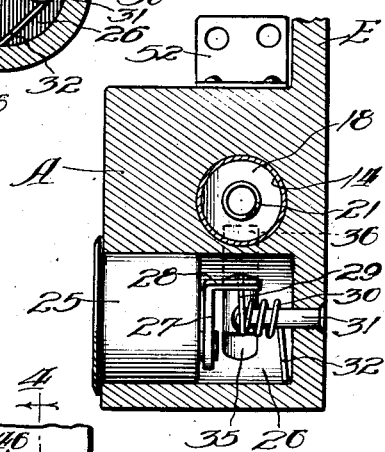
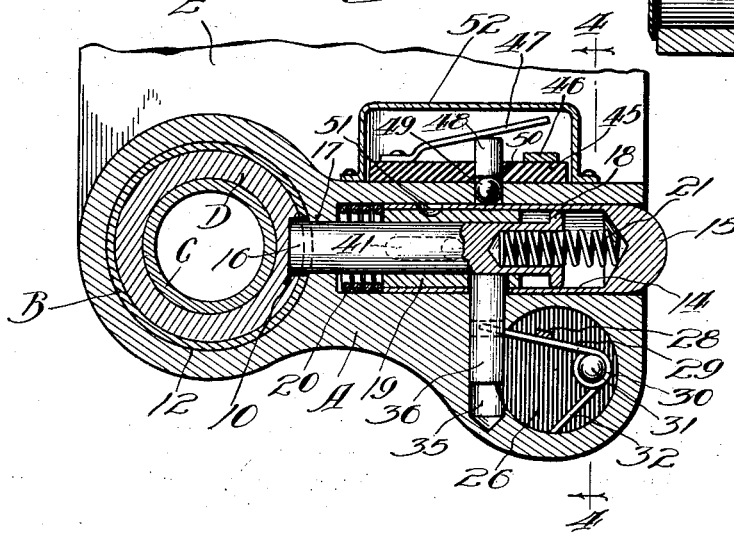
Inventor:
Orville S. Hershey Patented Sept. 6, 1927.

1,641,811

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Application filed December 12, 1923. Serial No. 680,088.

This invention relates to certain improvements in automobile locks, and more particularly to locks that are associated with the steering column of a motor driven vehicle to secure against rotation either the column, or post therewithin, which connects the steering wheel with the swiveled running wheels at the front of the vehicle.

It is a primary object of my invention to provide a lock of simple, practical, and efficient construction which may be contained within a housing which surrounds an automobile steering column, and which also may connect with a fixed part of the vehicle, such as the dash or instrument board so as to serve as a supporting bracket for the steering column; and to associate with such a housing an ignition lock which operates in conjunction with the steering lock whereby the motor, as well as the vehicle, may be disabled from operating. Other objects as well will hereinafter appear from the description and claims to follow wherein this invention is represented as consisting of certain parts which are constructed and arranged in accordance with the exemplification shown in the accompanying drawing in the manner following:

Figure 1 is a transverse section through a steering column to which is applied a housing containing the present lock, the section being taken in a plane coincident with the locking bolt which is here shown as disengaged from the column or steering post;

Fig. 2 is a similar view showing the bolt as advanced into locking relation with the steering post;

Fig. 3 is a detail in section taken on line 3—3 of Fig. 1; and

Fig. 4 is a detail in section taken on line 4—4 of Fig. 2.

The lock is represented as contained within a housing A adapted for mounting upon an automobile column B which, in the construction shown, surrounds in spaced relation a steering post C. Secured fast to the post in the region of the lock is a collar D having a longitudinal groove 10. Since the collar is associated with the post primarily for constructional reasons, and is to all intents and purposes a part thereof, it will be so treated in the description and claims to follow. As shown, the present lock is designed also for connection with a fixed part of the automobile, such as its dash or instrument board (not shown). A bracket plate E is used for this purpose, and it is provided with suitable openings 11 through which bolts or screws may be extended for connection with the instrument board, or other fixed part.

Within the body of the lock housing are formed certain cylindrical passages for the reception of the operating parts which will now be explained. I provide first of all a main longitudinal passage 12 extending through the body of the housing wherein may be received the column B. Intersecting this passage is a second passage 13 extending radially from one side of the housing for the purpose of accommodating a manually operable tubular button 14 whose outer end 15 is normally projected exteriorly of the housing. Within the button is arranged a cylindrical locking bolt 16 whose acting end is adapted to engage within the groove 10 of the collar D. As shown, the body walls are so formed at 17 as to provide a guide for the acting end of the bolt such as to impart thereto a proper lateral support at all times. The opposite bolt end is formed with a head 18 adapted to fit slidably within the button 14. The bolt may be secured against withdrawal from the button through the medium of a sleeve 19 which is secured fast within the latter, the outer sleeve end being so positioned as to constitute for the bolt a stop which normally prevents movement toward the column beyond that shown in Fig. 1. Since the sleeve is assembled fixedly within the button, and functions conjointly therewith, it will be proper hereinafter to treat these two parts as integral to all intents and purposes.

Interposed between the guide walls 17 and inner end of the button is a compression spring 20 which is coiled around the bolt 16, this spring acting normally to retract the parts to the position shown in Fig. 1. It is to be noted, however, that the bolt is yieldingly held in an advanced position relative to the button by means of a second coiled spring 21 whose strength is less than that of the other or main spring 20. This weaker spring is recessed in part within a socket 22 that is formed in the outer end of the bolt, one end of the spring being rested against the inner end of the socket and the other against the button end 15. By using two such springs of unequal strength, I provide for two movements, first, that of the button together with locking bolt under application of an inward pressure upon the button end, and secondly, a further advancement of the bolt, independent of its associated parts, when the collar groove 10 is brought into register with the bolt, this latter movement occurring in response to pressure of the weaker spring alone. Owing to the telescopic relation of the bolt to the button, these parts execute an aligned movement, and, in a sense, may be regarded as one, the button constituting, in effect, a yielding manipulative head for the bolt.

In association with a locking device of the kind described, I employ certain key-controlled means by which the movements of the bolt are definitely governed. As shown, this comprises a cylinder lock 25 of any approved kind, operable only with the aid of a proper key, such a lock being mounted within a cylindrical passage 26 which extends into the body of the housing from one side thereof. Upon its rear side, the cylinder lock carries an arm 27 having a rearwardly bent crank 28 engageable by one end 29 of a spring 30 that is coiled around a stud 31. As shown this stud is projected into the passage 26 from the rear end thereof, and affords a mounting for the coiled spring, whose opposite end 32 is rested against the walls of the passage, as shown in Figs. 1 and 2. Intersecting the passage 26 is another passage 35 wherein is slidably mounted a pin 36 notched or otherwise formed so as to accommodate the extremity of the spring end 29. Under the pressure of the spring, the pin is normally projected toward the button, wherein is formed a socket or opening 37 adapted to receive the acting end of the pin when the button is pushed inwardly sufficient for this purpose.

With the parts related as in Fig. 1, pressure may be applied to the outer button end to advance the locking bolt into engagement with the collar D where it may be projected into the groove 10 whenever the steering post is brought to the proper rotative position. When this takes place, the steering mechanism will remain disabled indefinitely, and can be restored to operative condition only by manipulation of the proper key within the cylinder lock rotation of which will effect a withdrawal of the pin 36 from engagement with the button socket 37. In order that the pin end may be assured at all times of entrance into this socket, I have shown a stop pin 40 entered into the body of the lock housing so as to project its inner end into a slot 41 which is formed longitudinally in the button. By this means the button movements are definitely limited and brought to a stop at the proper point to permit engagement of the pin 36 within the socket 37.

The locking mechanism heretofore described is designed to affect only the steering mechanism. It is so constructed and operated, however, that an ignition lock may be conveniently associated therewith. A suggestive form of such a lock, together with means for conjoint operation, is shown in Figs. 1 and 2, and includes in its assembly a switch which is interposed in the ignition circuit for controlling the operation of the vehicle motor.

The ignition lock, as shown, comprises an insulated block 45 whereon is secured a contact 46, and co-operating therewith a spring blade 47 which constitutes a switch in the motor ignition circuit. Normally the blade is adapted to rest upon the contact whereby the switch and electrical circuit is closed, this relationship of the parts obtaining at all times when the steering is operative. Extending between the steering and ignition locks is a pin 48 engaged by the under side of the blade 47, the other pin end being rested against a ball 49.

The pin and ball are slidably received within a passage 50 that extends both through the insulated block and the proximate wall of the lock housing, so that the ball is at all times pressed into frictional contact with the button. A shallow rounded socket 51 is formed in the outer surface of the button in register with the passage 50 when the parts are related as in Fig. 1, and in this socket the ball 49 may enter to permit closing of the switch. It thus results that the ignition circuit is completed whenever the steering mechanism is in condition for operation. With inward movement of the button the ball is forced out of its socket so as to hold the switch open as long as the locking bolt interferes with steering. The disabling of the steering and ignition is therefore accomplished simultaneously, as is also the restoration of these mechanisms to operative condition. The length of the slot 41 with which the pin 40 co-operates is such as to stop outward movement of the button at the point where the socket 51 registers with the passage 50, so as to assure closing of the switch with retraction of the locking bolt. Any suitable cap or housing 52 may be arranged over the ignition switch, as shown.

It is to be noted that the present lock is exceedingly simple in construction and operation. The bolt movements are controlled by a simple push button of tubular formation, the button and bolt being aligned for transmission of movement from one to the other in a single direction. Also the association with the push button is a friction lock—the ball 49—which may have operative relation with an ignition switch. Obviously the ignition lock may optionally be omitted without requiring any changes in the construction of the steering lock. The various details of construction, as hereinbefore set forth, are manifestly susceptible of embodiment in forms other than the precise one shown, such modifications, in so far as they fall within the purview of the claims below, being considered as embraced within the limits of my invention.

I claim:

1. In combination with a rotatable shaft having a slot, a lock therefor in which is included a slidable bolt adapted to enter the slot when the latter is aligned with the bolt, a control means for the bolt movable independently thereof, said control means including a plunger in which the bolt is telescoped, and a spring tending to eject the bolt from the plunger, and a switch having a connection with the control means and adapted to be operated thereby independently of the bolt, substantially as described.

2. In combination with a shaft having a slot, a lock therefor including a bolt slidable toward and from the shaft and adapted to enter the slot thereof when the latter is aligned with the bolt, control means for the bolt including a member which moves in the same direction therewith, a slip connection between said member and the bolt, spring means urging the bolt yieldingly against the shaft when the control means has been actuated, and a switch having connection with the control means and adapted to be actuated thereby independently of any movement by the bolt, substantially as described.

ORVILLE S. HERSHEY.